No. 669,614. Patented Mar. 12, 1901.
F. W. BERCK.
COOLING VESSEL.
Application filed Nov. 1, 1900.
(No Model.)
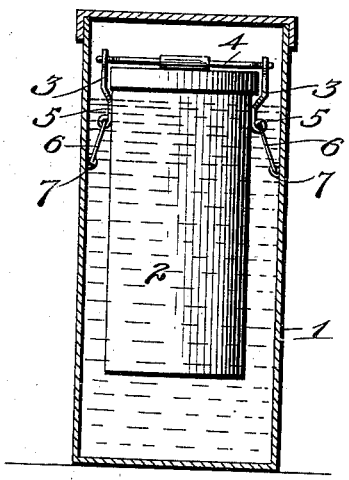
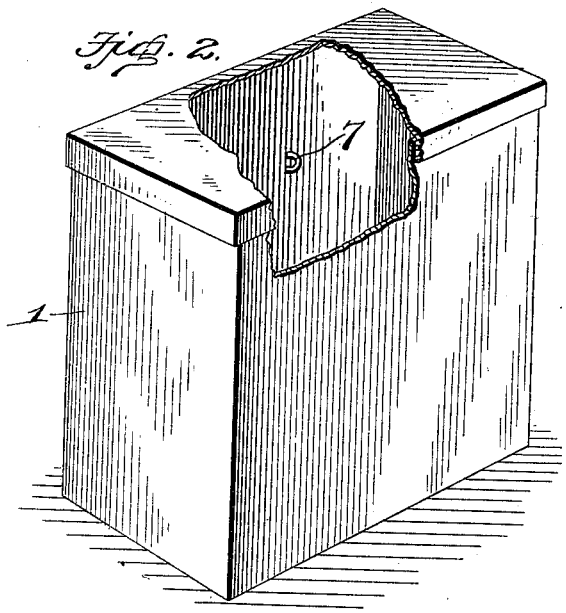
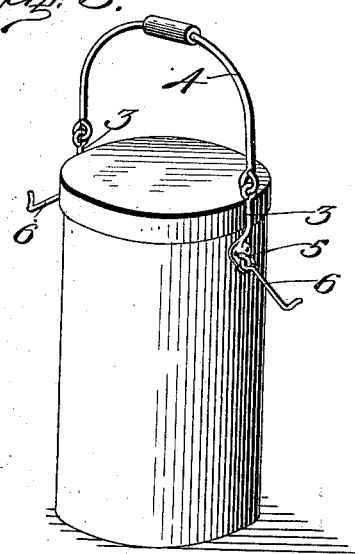
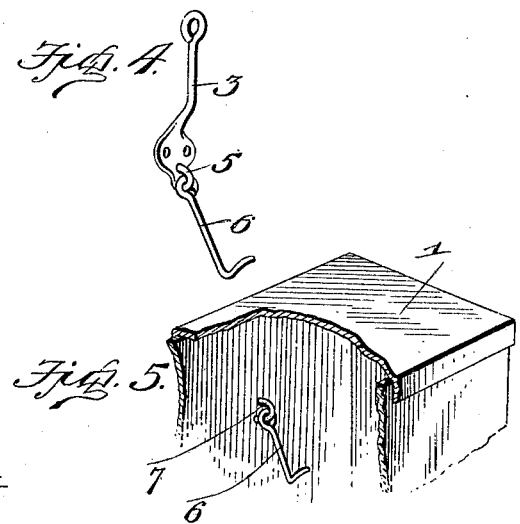
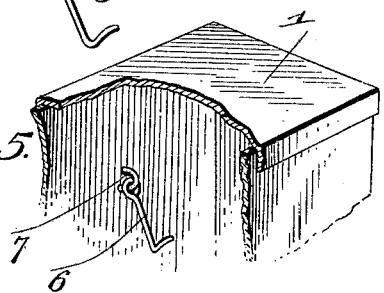
Witnesses
Inventor
F. W. Berck
By
Attorneys
THE NORRIS PETERS CO., PHOTO-LITHO., WASHINGTON, D. C.

UNITED STATES PATENT OFFICE.

FREDERIC WILLIAM BERCK, OF BOELUS, NEBRASKA.

COOLING VESSEL.

SPECIFICATION forming part of Letters Patent No. 669,614, dated March 12, 1901.

Application filed November 1, 1900. Serial No. 35,173. (No model.)

*To all whom it may concern:*

Be it known that I, FREDERIC WILLIAM BERCK, a citizen of the United States, residing at Boelus, in the county of Howard and State of Nebraska, have invented certain new and useful Improvements in Cooling Vessels; and I do declare the following to be a full, clear, and exact description of the invention, such as will enable others skilled in the art to which it appertains to make and use the same.

The invention relates to cooling vessels, and more particularly to vessels for cooling milk or cream.

One object of the invention is to provide a vessel with means for removably holding it submerged in water in a cooling-tank, whether or not the specific gravity of the vessel and its contents is less than that of the cooling agent in the tank, thereby preventing the vessel from floating or bobbing about in the tank. In most sections of the country when it is desired to cool milk to remove its animal heat or to allow it to set and permit cream to rise the milk is placed within a receptacle and the receptacle then lifted into a tank containing cool water. If the receptacle is full, it will lower in said tank and be entirely submerged by the water therein; but, on the other hand, if the said receptacle is but partially filled it will float and bob up and down, thus materially interfering with the rising of the cream. The present invention aims to cure these defects and also to enable the milk-receptacle to be placed in a tank in an empty condition and be held submerged therein while it is being filled with milk, thus overcoming the objection to lifting the filled receptacle into the tank.

With these and other objects in view the invention consists in certain features of construction and combination of parts, which will be hereinafter more fully set forth.

In the accompanying drawings, Figure 1 is a sectional view of the tank and milk-receptacle, showing the latter held submerged within the former. Fig. 2 is a detail perspective view of the tank with a portion broken away. Fig. 3 is a detail perspective view of the milk-receptacle. Fig. 4 is a similar view of one of the bail-ears, and Fig. 5 is a modification.

Referring to said drawings, 1 denotes the cooling-tank, and 2 the milk-receptacle, each of which may be of any well-known or approved construction. The milk-receptacle is provided with the bail-ears 3, to which is connected in the usual manner a bail 4. The bail-ears are the same as those now generally employed on milk-cans, with the exception that they are provided with an extra eye 5, to which is adapted to be connected a hook 6, which when the receptacle is placed within the tank is adapted to be hooked into staples 7, secured within the side of the tank in proper position to hold the milk-receptacle submerged in the water contained therein. A reversal of this arrangement is shown in Fig. 5, in which the staple 7 is shown provided with hooks instead of eyes, and when this arrangement is employed said hooks are adapted to have their free ends connected to the eyes of said bail-ears. In either case the result is the same—namely, the receptacle will be held submerged in the water in the tank and be prevented from bobbing up and down and moving about.

I am aware that it is not new, broadly considered, to hold a milk-receptacle submerged in the water in a tank, for this has been and is being done by tying or loading the receptacle down with weights or rocks. This manner of holding the receptacle submerged is objectionable, in that in a very short space of time the cans become so indented by the rocks or weights as to render them useless.

From the foregoing description, taken in connection with the accompanying drawings, the construction, operation, and advantages of my invention will be readily understood without requiring an extended explanation.

The device is exceedingly useful for the purpose for which it is designed and may be placed upon the market at a comparatively small cost.

Various changes in the form, proportion, and the minor details of construction may be resorted to without departing from the principle or sacrificing any of the advantages of this invention.

Having thus fully described my invention, what I claim as new, and desire to secure by Letters Patent, is—

The combination with a cooling-tank provided with staples on its inner side and a vessel adapted to be placed therein, of ears each consisting of a rod flattened intermediate its ends to form an attaching-plate to be secured to the vessel and having its ends terminate in eyes, a bail attached to the one set of eyes, and hooks for connecting the other set of eyes to the staples secured to the tank, substantially as described.

In testimony whereof I have hereunto set my hand in presence of two subscribing witnesses.

FREDERIC WILLIAM BERCK.

Witnesses:
WM. BERCK,
T. J. HANSEN.